United States Patent [19]

Reed

[11] Patent Number: 4,662,806

[45] Date of Patent: May 5, 1987

[54] METAL LOCK SYSTEM AND METHOD

[75] Inventor: Gary J. Reed, West Valley, Utah

[73] Assignee: Reed International, Incorporated, Salt Lake City, Utah

[21] Appl. No.: 552,759

[22] Filed: Nov. 17, 1983

[51] Int. Cl.⁴ .................... F16B 31/00; F16B 35/04; B65D 69/00; B23P 7/00

[52] U.S. Cl. .................................. 411/2; 29/156.4 R; 29/402.12; 29/402.15; 29/402.17; 29/558; 206/582; 206/231; 411/307; 411/411; 411/424; 411/426

[58] Field of Search ................. 206/582, 231; 29/530, 29/402.09, 402.12, 402.14, 402.15, 402.17, 402.11, 557, 558, 156.4 R, 700; 411/378, 411, 424, 426, 1, 2, 3, 5, 263, 307

[56] References Cited

U.S. PATENT DOCUMENTS

| | | | |
|---|---|---|---|
| 2,011,484 | 8/1935 | Harman | 29/402.17 X |
| 2,121,692 | 6/1938 | Hays | 29/402.17 |
| 2,213,040 | 8/1940 | Drissner | 29/558 |
| 2,361,701 | 10/1944 | Michaels | 29/402.17 |
| 2,506,233 | 5/1950 | Murphy | 29/402.17 |
| 2,517,706 | 8/1950 | Paquin | 29/558 X |
| 2,649,650 | 8/1953 | Javor | 29/402.17 |
| 2,951,506 | 9/1960 | Diperstein | 29/402.12 |
| 2,998,645 | 9/1961 | Diperstein | 29/402.17 |
| 3,066,400 | 12/1962 | Forsythe | 29/402.17 |
| 3,184,769 | 5/1965 | Barwood | 411/378 X |
| 3,193,858 | 7/1965 | Kahn | 29/402.15 |
| 3,344,817 | 10/1967 | Connard | 29/527.4 X |

FOREIGN PATENT DOCUMENTS

| | | | |
|---|---|---|---|
| 154074 | 5/1953 | Australia | 29/402.17 |
| 154075 | 5/1953 | Australia | 29/402.12 |
| 494402 | 5/1954 | Italy | 29/402.12 |

OTHER PUBLICATIONS

Seal-Lock International Promotional Brochure entitled "Seal-Lock Now", bearing copyright date of 1979. *
Seal-Lock ® Product Identification Sheet by Seal-Lock International, Inc. (no date—believed to be after 1979).
Brochure entitled "Now", by Seal-Lock International dated 1981.
Brochure entitled "Seal-Lock ® Cold Welding Process" by Seal-Lock International dated 1981.
"Minimize Downtime" Brochure by Utah Casting Repair (circa 1982).

Primary Examiner—Howard N. Goldberg
Assistant Examiner—Ronald S. Wallace
Attorney, Agent, or Firm—Robert R. Finch; B. Deon Criddle

[57] ABSTRACT

Apparatus for repairing a casting having a crack therein comprising a metal lock to extend across the crack and a lacing plug to fit in the crack, the metal lock formed as a rigid elongate member having a plurality of lobes formed from adjacent portions that are circular in cross-section and each having its center on the longitudinal axis of the elongate member, said lobes being of alternating large and small diameters and including a central large diameter lobe and at least one outer large diameter lobe at each side of the central large diameter lobe, said central large diameter lobe being spaced from each outer large diameter lobe by a small diameter lobe and with each lobe overlapping its adjacent lobe and extending through the elongate member; and the lacing plug including a head configured to receive a driving tool, a tapered shaft, a shoulder at a top of the tapered shaft, a non-threaded shaft portion interconnecting the head and the tapered shaft, a break-off groove formed in the non-threaded shaft portion adjacent to the shoulder, and straight threads formed on the tapered shaft, said threads having a uniform minor pitch diameter and a tapered major pitch diameter, said major pitch diameter being parallel to the outer diameter of the tapered shaft.

14 Claims, 20 Drawing Figures

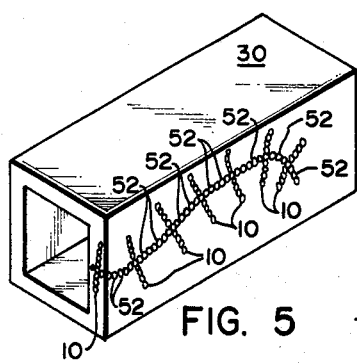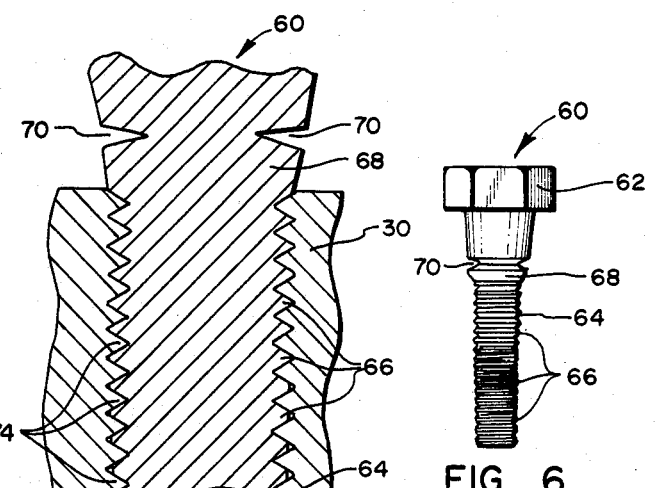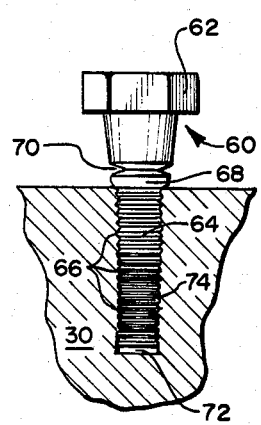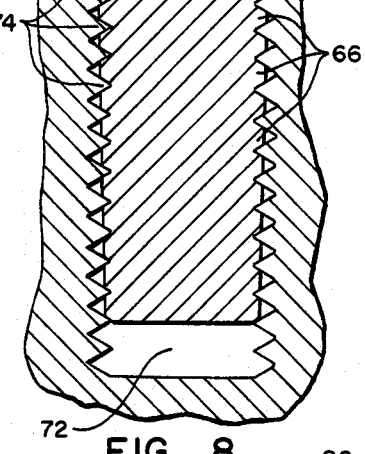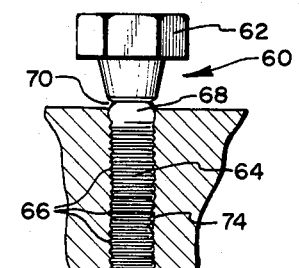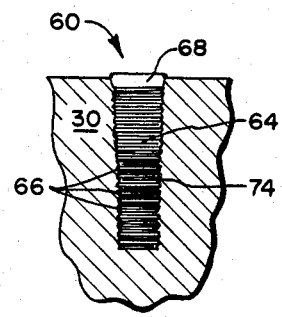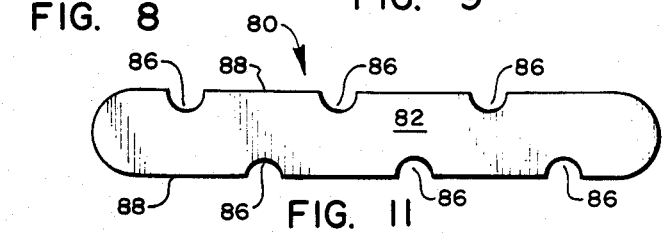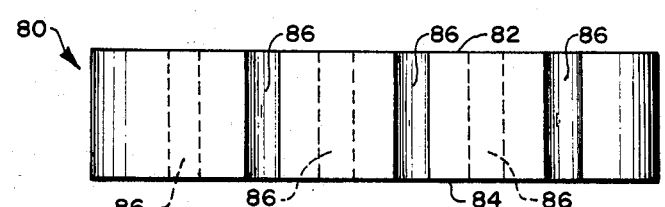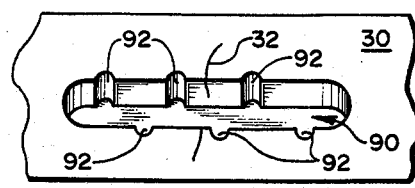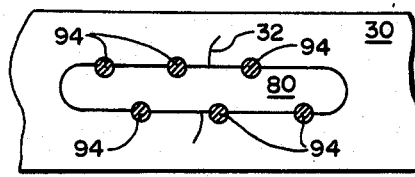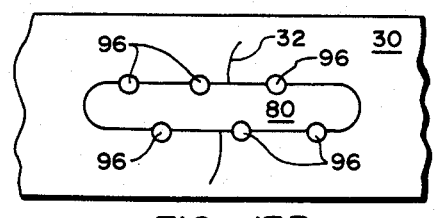

METAL LOCK SYSTEM AND METHOD

The present invention relates to cold metal repair of damaged metal parts, and more particularly, to a system for cold metal repair of breaks, cracks, or holes in cast iron castings.

BACKGROUND OF THE INVENTION

Many machine parts, components, brackets or supports, mountings, and the like, are made of cast iron. Such cast iron castings have been used because of the strength and durability of cast iron. However, cast iron is not infallible and sometimes such castings will become cracked or broken. In the past, it has been very difficult, or even impossible, to repair such cast iron castings. A number of repair methods have been utilized, each with its own advantages and disadvantages. However, no one method for repairing cast iron castings is appropriate for all repair situations. Generally, the repair methods have included welding, brazing, epoxys, and metal stitching.

The primary drawback to using welding to repair a damaged casting is that dependable results are not consistently obtained. Cast iron is not structurally capable of withstanding concentrated applications of heat incident to the welding repair. A casting is frequently weakened significantly or is rendered brittle in the areas of the heat application. So weakened, it is not unusual for a repaired casting to develop new cracks near the welded area. Also, a casting made brittle by welding is extremely difficult to machine and is not nearly as tolerant of stress as the original casting. Thus, welding repair of castings usually invites recracking.

Similar disadvantages are encountered when brazing is used to repair a broken or cracked casting, because brazing also requires a specific application of heat to the casting and its repair area.

A further disadvantage to using welding or brazing in casting repair is that the casting cannot normally be repaired on-site. This is because the complex methods of welding and brazing require specific equipment that may not be mobile for on-site repairs. Thus, the casting must be removed from the location where it is used and transported to where it may be repaired. This can be extremely expensive and frequently results in significant plant down-time.

Another method for casting repair is the use of epoxys or other chemical adhesives to fill in the cracked or broken portion. However, such repairs are usually only temporary because the bond created will not withstand the stresses which causes the damage to the casting in the first instance or the normal stresses placed on the casting during ordinary use.

Metal stitching has been used when extreme heat may alter or destroy the molecular structure of the casting, as well as when other methods are impractical or prohibitive. With metal stitching, high tensile strength fasteners are embedded across the cracks in the damaged casting to firmly secure the separated elements. Then, tapered lacing plugs are worked into the metal along the cracks providing a pressure and liquid tight seal. Since most metal stitching repairs can be implemented on-site without disassembling the damaged casting, down-time and labor costs are significantly minimized.

However, the present forms of metal stitching do have some drawbacks. At present, metal stitching is performed by pounding a metal lock into a line of bores that have been prepared to receive the lock. The line of bores run transverse to the crack. The metal lock used has a concave curvature and usually comprises three or five lobes of equal diameter aligned such that the circle of each lobe slightly intersects the next adjacent lobe. Because of the concave structure of the metal locks now used for metal stitching, a couple of very significant disadvantages occur during the process of pounding the metal lock into position within the series of intersecting bores prepared to receive the lock. First, it is the outermost lobes of the metal lock which engage the prepared bores first. When these outermost lobes are forced into the prepared bores they can cause the crack to further separate thereby introducing new stresses and strains to the casting. Second, this problem is further aggravated because as the metal lock is forced into position deep within the prepared bores the concave metal lock tends to flair out from its center thereby compounding the stresses which may cause separation of the crack in the casting.

One or more metal locks are usually secured within a set of prepared bores. If the length and nature of the crack require additional constriction, several metal locks are positioned across the crack at intervals of distance to hold the casting and prevent further cracking. When it is desired to maintain a pressure or liquid tight seal in the casting, a series of lacing plugs are typically used to seal the crack from leaking. These lacing plugs are positioned in a slightly overlapping alignment along the length of the entire crack and between each of the metal locks.

The lacing plugs presently being used are tapered plugs with tapered threads. Such lacing plugs are placed within bores prepared along the length and path of the crack. Because a very tight fit is desired, the threads of the tapered lacing plugs are usually slightly oversized. In this manner the plug engages the threads in the bore in pressure and liquid tight engagement. After the plug is tightened into the receiving bore, the head of the plug is cut off and the remaining stub is ground and/or peened flush with the surface. The other tapered plugs are positioned seriatim in a similar fashion along the crack. When the lacing is completed, it runs the full length of the crack and each plug intesects with the next adjacent plugs to assure that a proper seal is obtained.

The tapered lacing plugs known and used in the art have presented several problems which heretofore have remained unsolved. Because the lacing plugs are tapered and have tapered threads, they are designed to threadably engage a receiving bore which has been tapped with a tapered tap. It is the present practice to drill straight bores and then tap that bore with a tapered tap. This is a difficult procedure that frequently results in damaged threads or a broken tap. When a tap breaks within the receiving bore it is extremely difficult and time-consuming to remove the broken tap. Removal of the broken tap almost always damages the treads and damaged threads drastically increase the likelihood that a pressure and air tight fit may not be achieved. Thus, the cost of and time loss attributable to each job requiring lacing is increased.

Another problem with the prior art tapered plugs arises because they are typically slightly oversized to assure a snug fit. Thus, as they are threaded into position, they act like a wedge being driven into the metal. Consequently, with the insertion of each successive tapered plug into the lacing, there is a tendency to loosen the prior inserted plugs and to further separate the crack. In many instances, this increases the stresses on the repaired casting and may ultimately cause further cracking or new cracks in the casting. Also, when the plugs are loosened their effectiveness is significantly reduced. Thus, after the heads of the tapered plugs are removed, the plugs are peened so as to seat the plugs more firmly to prevent leaking that may be caused by the loosened plugs. Such peening damages the surface of the casting. The damaged surface must then be repaired through time-consuming cosmetic repair techniques.

Still another problem involves the actual threading of the plugs into the receiving bores. If for some reason the plug binds during threading, it may break off. Such plugs do not break off cleanly above the surface; rather, they usually break off in an irregular break which is, at least, partially below the surface of the casting being repaired. Unless repaired by inserting another plug, a scar is left in the surface of the casting and this scar is a weak spot in the seal.

A further disadvantage to metal stitching in general is that it has been somewhat limited to smaller applications and applications where the structure of the casting permits drilling at or near the area of the crack or break. There are occasions, however, in which precision drilling in the area of the crack or break cannot be done. In those instances, metal stitching has not been a practical approach to casting repair.

BRIEF SUMMARY AND OBJECTS OF THE INVENTION

The metal lock device and method of the present invention eliminates many of the disadvantages created by the metal locks presently used for metal stitching. The metal lock device of the present invention comprises a substantially flat metal lock having a plurality of linearly aligned, adjacent lobes comprising both large and small lobes. The large lobes and small lobes are arranged so as to alternate in series alignment and such that the circles formed by each lobe slightly intersects with the adjacent lobe. This configuration greatly increases the total volume grasping area (i.e., the area defined by the line tangent to each large lobe and the outer edge of the metal lock) created by the metal lock of the present invention. Further, the substantially flat nature of the metal lock enables the user to insert the metal lock into the bores prepared by first driving the central most lobe into the appropriate bore. This tends to tie in the crack or break in the casting and significantly inhibits the flaring or separating presently experienced with the concave metal locks in the prior art. Also, because there is no concaveness to pound out of the metal lock, there is no flairing of the lobes away from the center.

The improvement of the flat metal lock having alternate sized lobes in enhanced by the method by which the precision drilled bores are prepared to receive the metal lock. With the method of the present invention, a pilot hole centered on the crack or break is drilled. This pilot hole has a diameter smaller than the diameter of the holes which will be drilled for accepting the large lobe of the metal lock. Preferably, the diameter for each pilot hole is also slightly smaller than the holes that will be drilled to accept the small lobes of the metal lock. The purpose of the pilot hole is to accept a positioning pin of a first drilling jig. This first drilling jig, with positioning pin in place, enables the user to precision drill another pilot hole corresponding to the bore which will be drilled for one of the outermost lobes of the metal lock on a line substantially transverse to the crack. Once this second pilot hole is drilled, two pins of the first drilled jig may be positioned within the pilot holes to assure that the next pilot hole, corresponding to the bore to receive the opposite outermost lobe of the metal lock, is aligned, positioned and drilled. If the metal lock to be used in the repair is of a threelarge-lobe configuration, the intermediate bores for receiving the small lobes of the metal bore are precision drilled using the first jig positioned via positioning pins in the pilot holes. These intermediate bores do not intersect with the previously drilled pilot holes. If the metal lock to be used in the repair is of a five-large-lobe configuration, intermediate pilot holes corresponding to the intermediate bores for receiving the large lobes are precision drilled. Then, the intermediate bores for receiving the small lobes of the metal lock are drilled precisely aligned via use of positioning pins placed in the pilot holes provided. Again, these intermediate bores do not intersect with the previously drilled pilot holes.

After the small intermediate bores are drilled, a second drill jig is used, with positioning pins inserted into the outermost pilot holes, to precision drill the center and/or intermediate bores for receiving the large lobes of the metal lock. Because the small bores do not intersect with the pilot holes, it is much easier to start and precision drill the large bores than if pilot holes were not there to act as a guide. Next, a third drill jig is used with positioning pins positioned within the newly drilled center and/or intermediate bores to precision drill the outermost large lobes of the metal lock. When prepared in this manner, the large and small bores are precision drilled to align properly and to snuggly receive the metal lock.

Once the bores are prepared the metal lock is placed over the prepared bores. The metal lock is inserted into the bores by hammering or pounding the centermost lobe into the centermost bore and working the metal lock out from the center to the outermost lobes. This method of insertion eliminates unnecessary flaring of the lock and separation of the crack and introduces very little or no stress to the casting in the damaged area. This procedure is repeated for each metal lock to be positioned across the crack or break.

After each metal lock is positioned within its respective prepared bores, stitching procedures along the crack or break are performed. This involves drilling and tapping a hole centered on the crack with is adjacent to and slightly intersecting the large central lobe of the metal lock. A plug is threaded into the tapped hole. This procedure is followed alternately on each side of the metal lock along the line of the crack or break until the entire length of the crack or break is locked into position by metal locks and a lacing of intersecting metal plugs.

The metal plugs of the present invention comprise a tapered shaft with straight threads, a shoulder, a break-off groove, and a head. By providing metal plugs having tapered shafts with straight threads, the receiving bores can be straight bores which are tapped with a conventional straight tap. Because straight taps are easier to operate than tapered taps, and a straight tap used to tap a straight bore is less likely to break off in the bore, the use of straight taps offer a significant savings in time and expense.

The tapered shaft enables the lacing plug to be inserted into and started within the straight receiving bore very easily, even if the straight bore is positioned at an angle rather than directly vertical. Thus, the likelihood that threads will be stripped or damaged is also significantly reduced with the straight-threaded tapered metal plug.

Disposed directly above the threads on the plug shaft is the shoulder which bites into and crushes the first few bore threads as the plug is securely tightened. This crushing action seals the threads from pressure and liquid leaks.

Intermediate of the shoulder and the plug head is the break-off groove which encircles the plug shaft. This break-off groove is cut slightly deeper than the threads on the tapered shaft. This introduces a potential break-off plane to the plug which has some definite advantages. By adjusting the depth of the groove in the manufacture of the metal plugs, it can be predetermined at what torque the plug head (which is a hex head or some other wrench or screwdriver compatible head) will break free of the tapered shaft. Thus, the plug head breaks off above the surface of the casting under a predetermined torque which will be sufficient to permit the shoulder to crush the first few threads of the receiving bore, but no damage other threads. This also eliminates the steps of cutting off the head of the plug and of peening the plug. Consequently, a considerable time-savings is introduced. Further, after the head breaks off, there is more room to maneuver a drill for drilling subsequent receiving bores and the inserted plug is ready for grinding and finishing.

In instances where the casting will not permit precision drilling on the crack or break or where a heavy duty lock is desired, a modified metal lock (hereinafter called the "metal bar") is used. The metal bar is a thick, substantially flat surfaced bar having a plurality of notches along its longitudinal sides. The notches along one side of the metal bar are offset from the notches along the other side of the metal bar.

To prepare the casting to receive the metal bar, a recess in the casting is bored out of the casting using a hogger to accommodate the dimensions of the metal bar. Notches, corresponding to the notches in the metal bar, are carved from the walls of the recess along the outer edge of the recess hogged out from the casting. Again, the hogger or a drill is used for this purpose. The purpose for the notches in the metal bar and in the walls of the recess is to receive in threaded engagement a bolt or tapered lacing plug.

Once the recess is prepared as described above, the metal bar is positioned over the recess and inserted therein by hammering from the center outward. The holes defined by the notches in the metal bar and in the walls of the recess are then tapped and filled with a threaded plug. The outer surface of the casting repair can then be peened and ground to a finshed condition, if necessary.

It is an object of the present invention to provide a significantly improved metal lock apparatus and method by which casting repair may be accomplished by metal stitching.

Another object of the present invention is to provide an increased grasp area for the metal lock used in metal stitching thereby increasing the strength of the lock used.

A further object of the present invention is to provide a method for precision drilling of the bores which are to receive the improved metal lock device.

Still another object of the present invention is to provide a metal lock device which does not cause stresses which tend to separate the crack or break in the casting.

Another object of the present invention is to provide a method for metal stitching which can be performed on-site in order to save down-time and labor costs.

A further object of the present invention is to provide a tapered lacing plug having straight threads so as to be compatible with and easily inserted into a straight tapped bore.

Another object of the present invention is to provide a lacing plug in which its head breaks off during threading at a predetermined torque, thereby eliminating the usual step of head removal.

Still another object of the present invention is to provide a lacing plug in which its head breaks off during threading at a predetermined torque which is sufficient to cause a shoulder for the lacing plug to bite and crush the top few threads of the receiving bore; thereby eliminating the usual step of peening the plug.

Yet another object of the present invention is to provide a metal lock device which can be used in instances where the casting is resistant to precision drilling in the immediate area of the crack or break.

Other objects and advantages of the present invention will become apparent upon reading the following description and appending claims, and upon reference to the accompanying drawings.

BRIEF DESCRIPTION OF THE DRAWINGS

These and other objects and features of the present invention will become more fully apparent from the following detailed description and appended claims taken in conjunction with the accompanying drawings.

FIG. 5 is a perspective view of a rectangular block showing a cold metal repair of a crack using several metal locks and metal lacing;

FIG. 6 is a side elevational view of a preferred embodiment of the tapered lacing plug of the present invention showing straight threads on a tapered shaft, a break-off groove, a shoulder and a hex head;

FIG. 7 is a side elevational view of a straight bore in cut-away section showing a tapered lacing plug as shown in FIG. 6 partially threaded therein;

FIG. 8 is an enlarged side elevational, sectional view of a straight bore and tapered lacing plug showing the engagement of the threads of the tapered lacing plug with the threads of the straight bore;

FIG. 9 is a side elevational view of a straight bore in cut-away section showing a tapered lacing plug as shown in FIG. 6 threaded therein so that the shoulder of said plug crushes the upper few threads of said bore;

FIG. 10 is a side elevational view of a straight bore in cut-away section showing a tapered lacing plug as shown in FIG. 6 after the head thereof has been broken off at the break-off groove;

FIG. 11 is a plan view of the top, substantially flat surface of a preferred embodiment of the metal bar of the present invention;

FIG. 12 is an elevational side view of the metal bar embodiment shown in FIG. 11;

FIG. 13 is a perspective view of a partial casting surface showing a crack to be repaired and the transverse recess removed from the casting to receive a metal bar;

FIG. 13A is a plan view of a partial casting surface showing a metal bar positioned within a transverse recess and defining bores (shaded) ready to receive lacing plugs; and FIG. 13B is a plan view of a partial casting surface showing a metal bar secured in position in a transverse recess by lacing plugs.

DETAILED DESCRIPTION OF THE PREFERRED EMBODIMENTS

Reference is now made to the drawings wherein like parts are designated with like numerals throughout.

Figure 1:
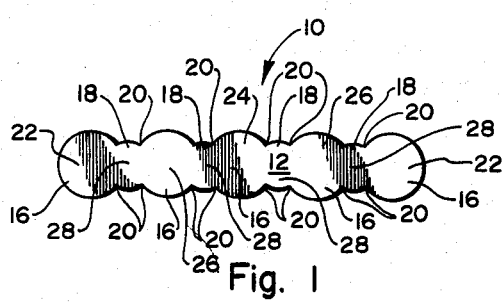
FIG. 1 is a plan view of the top, substantially flat surface of a preferred embodiment of the metal lock of the present invention.
Figure 2:
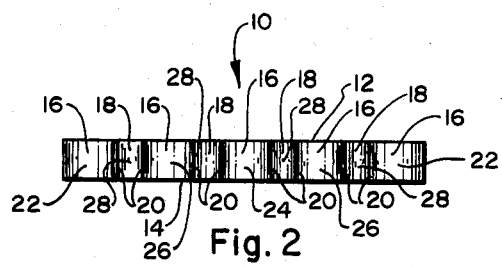
FIG. 2 is an elevational side view of the metal lock embodiment shown in FIG. 1.

FIGS. 1 and 2 illustrate a preferred embodiment of a metal lock 10 of the present invention. The metal lock 10 is elongated and has a substantially planar top surface 12 which is parallel to a bottom surface 14. The metal lock 10 also has a plurality of large lobes 16 and small lobes 18 which define an irregular configuration for the peripheral edge of the metal lock 10. The large lobes 16 and small lobes 18 are aligned such that the centers of the circles defined thereby lie on the center longitudinal axis of the metal lock 10. In this preferred embodiment, the metal lock 10 comprises five large lobes 16 having equal diameters and four small lobes 18 having equal diameters aligned alternately along the longitudinal axis. However, it should be understood that any number of large or small lobes 16, 18 may be used and they may have various diameters. For example, for smaller applications, a metal lock 10 with three large lobes 16 and two small lobes 18 may be used.

It is preferred that the large lobes 16 and small lobes 18 be aligned alternately such that the circle defined by each large lobe 16 intersects the circle defined by each next adjacent small lobe 18 at two points of intersection. This makes the irregular configuration of the metal lock 10 one of overlapping circles which is sturdy and not likely to break. So configured, the metal lock 10 has a plurality of ribs 20 which extend perpendicular to the top and bottom surfaces 12 and 14 as shown best in FIG. 2. Thus, the metal lock as shown in FIGS. 1 and 2 has outermost lobes 22, a center lobe 24, intermediate large lobes 26 and intermediate small lobes 28.

Figure 3:
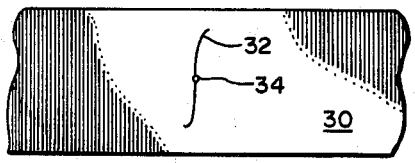
FIG. 3 is a plan view of a partial casting surface showing a crack to be repaired and the center pilot hole.
Figure 3A:
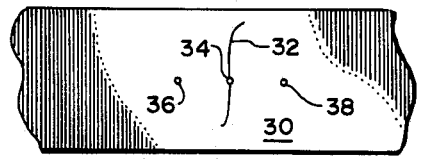
FIG. 3A is a plan view of a partial casting surface showing three pilot holes aligned transverse to a crack to be repaired.
Figure 3B:
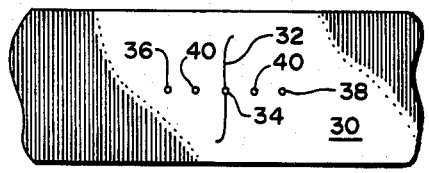
FIG. 3B is a plan view of partial casting surface showing five pilot holes alinged transverse to a crack to be repaired.

The purpose of the metal lock 10 is to hold a crack or break in a metal casting closed to prevent further cracking or breaking of the casting. The metal lock 10 is inserted into a recess carved from the casting which has been prepared to receive one or more metal locks 10. FIGS. 3 through 3E illustrate a preferred method for preparing a recess in the casting to receive a metal lock 10.

In FIGS. 3 through 3E, the surface of a casting 30, such as a cast iron casting or the like, is shown with a crack 32 to be repaired. Although cracks 32 usually extend from an edge or an appendage rather than as shown in isolated form, the teachings of this invention apply equally to almost all types of cracks or breaks and the isolated crack shown serves adequately for illustrative purposes.

In FIG. 3, a center pilot hole 34 is drilled such that its center lies on the crack 32. It is preferred that the center pilot hole 34 have a diameter somewhat smaller than the diameter of the center lobe 24 of the metal lock to be used in the repair.

A pin for a drilling jig is positioned in the center pilot hole 34 so that the jig can assist in drilling a second pilot hole 36 remote from the crack 32 and on a line substantially perpendicular to the crack 32 at the center of the center pilot hole 34. This enables the repairman to precision drill the second pilot hole 36 at a predetermined distance from the center pilot hole 34. That distance corresponding to the distance between the center lobe 24 and an outermost lobe 22 of the metal lock 10 to be used in the repair. Another pin from the drilling jig is positioned in the second pilot hole 36 so that the drilling jig facilitates the precision drilling of a third pilot hole 38 by holding sturdy the drill at the predetermined distance corresponding to the distance between the center lobe 24 and an outermost lobe 22 and in alignment with the centers of the previously drilled pilot holes 34 and 36. FIG. 3A shows the center, second and third pilot holes 34, 36 and 38 as drilled to define a line substantially perpendicular to the crack 32. Although it is preferred that the alignment of the pilot holes 34, 36 and 38 be substantially perpendicular to the crack 32, it should be understood that such is a preferred alignment. Other nonperpendicular alignments may be used to adapt to the contour of the casting surface or to accommodate difficulties in drilling along the preferred alignment.

Intermediate pilot holes 40 are then precision drilled using a jig anchored via pins placed into one or more of the previously drilled pilot holes. These intermediate pilot holes 40 are positioned in alignment with and between the previously drilled pilot holes 34, 36 and 38, as shown in FIG. 3B. The distance in which the intermediate pilot holes 40 are drilled from the center pilot hole 34 corresponds to the distance between the center lobe 24 and the intermediate large lobes 26 of the metal lock 10 to be used in the repair.

As with the center pilot hole 34, it is preferred that the second, third and intermediate pilot holes 36, 38 and 40 have a diameter somewhat smaller than the diameter of the large lobes 16 of the metal lock 10. It is the purpose of the pilot holes to facilitate precision drilling by providing holes in which to anchor the drilling jig. Also, as will be described more fully below, the pilot holes make the drilling of bores to accept the metal lock 10 easier and much more precise.

Figure 3C:
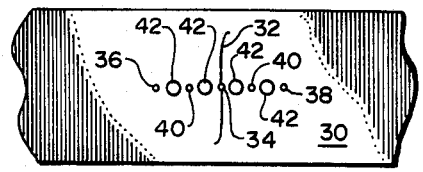
FIG. 3C is a plan view of a partial casting surface showing five pilot holes and four small bores disposed in transverse alignment to a crack.

As shown in FIG. 3C, small bores 42 are drilled between the previously drilled pilot holes 34, 36, 38 and 40. These small bores 42 can be precision drilled using a drilling jig which positions the drill. It is preferred that the small bores 42 have a diameter for receiving snuggly the intermediate small lobes 28 of the metal lock 10 to be used in the repair and that the diameter of the pilot holes be such that the small bores 42 do not intersect with the pilot holes 34, 36, 38 and 40, as shown in FIG. 3C. In this manner, the small bores 42 maintain a precise integrity which is ultimately advantageous to the effectiveness of the metal lock 10 to secure the casting 30 from leaking or further cracking. Also, if the small bores 42 do not intersect with the pilot holes, the pilot holes 34, 36, 38 and 40 serve more effectively as guide holes for subsequent precision drilling.

Figure 3D:
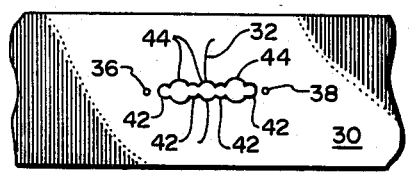
FIG. 3D is a plan view of a partial casting surface showing two outermost pilot holes and aligned intermediate thereto is the irregular cavity comprised of four small bores and three large bores.
Figure 3E:
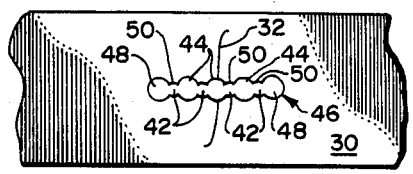
FIG. 3E is a plan view of a partial casting surface showing a recess comprised of alternating and overlapping large and small bores in transverse alignment to a crack being repaired.

As shown in FIG. 3D, it is preferred to next drill central bores 44 in the casting 30 which correspond to the center and intermediate pilot holes 34 and 40. These central bores 44 can be precision drilled using a jig which is anchored into previously drilled pilot holes 36 and 38 in the casting 30. By using pilot holes 36 and 38 for this purpose, the bores to receive the metal lock 10 are not unnecessarily damaged should the jig slip or move for any reason. The central bores 44 have a diameter which will snugly receive the center and intermediate large lobes 24 and 26 of the metal lock 10 and which defines a circle which intersects with each circle defined by the next adjacent small bore 42 at two points of intersection.

An irregular recess 46 configured to receive the metal lock 10, as shown in FIG. 3E, is completed by drilling outermost bores 48 corresponding to the second and third pilot holes 36 and 38 in which the outermost bores 48 have a diameter which will snugly receive the outermost lobes 22 of the metal lock 10. The precision drilling of these outermost bores 48 can be facilitated by using a jig anchored into position by a pin or pins in the previously drilled bores 42 and 44. It is preferred that each of the outermost bores 48 define a circle which intersects with the circle defined by the next adjacent small bore 42 at two points of intersection.

As shown in FIG. 3E, the configuration of the irregular recess 46 corresponds to and will receive the metal lock 10 in snug engagement. By using the precision drilling as described above, there is no need to chisel out between the bores as has been the case with some metal locks heretofore known in the industry. Also, as described, the irregular recess 46 defines gripping teeth 50 which provide larger and more substantial grasping areas than previously used recesses for known metal locks. The depth of the irregular recess 46 depends on the thickness of the casting 30 and the irregular recess 46 is preferably drilled to a predetermined depth to receive one or more metal locks 10 stacked one on top of the next.

In order to insure a snug fit while not causing the crack to further separate, it is preferred that the metal lock 10 be slightly oversized in its width and slightly undersized in its length. Sizing that has proved to be most satisfactory is where the metal lock 10 is 0.002 of an inch wider than the irregular recess 46 and 0.008 of an inch shorter than the irregular recess 46. This tends to pull the crack 32 together as the lock 10 is imbedded in the casting 30.

In order to insert a metal lock 10 into a prepared irregular recess 46, it is preferred that the metal lock 10 be placed directly over the recess 46 and then initially pounded into the recess 46 at the center lobe 24 using a hammer or the like. This will serve to lock the crack 32 and prevent further separation of the crack 32. The remainder of the metal lock 10 is then pounded into the recess 46 working from the center lobe 24 outward towards the outermost lobes 22. If the depth of the recess 46 permits, additional metal locks 10 may be inserted in a like manner.

For some repairs, particularly those not requiring a liquid- or air-tight seal, the lock may be complete upon peening and/or grinding the upper metal lock 10 until it is flush with the surface of the casting 30. If the crack 32 is large enough in length, it may be advisable to position more than one metal lock 10 at intervals along and transverse to the crack 32. FIG. 5 illustrates a casting repair showing the use of several metal locks 10 positioned at intervals along the crack which was repaired.

Figure 4:
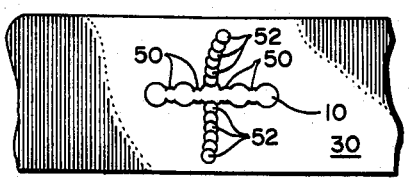
FIG. 4 is a plan view of a partial casting surface showing a cold metal repair of a crack using a metal lock and metal lacing.

With regard to other repairs, a liquid- or air-tight seal may be required. In those instances, after the metal locks 10 are set into position, the crack 32 should be laced with lacing plugs 52 to seal the crack 32. The preferred method for lacing the crack 32 with lacing plugs 52 is illustrated in FIG. 4. A lacing bore is drilled adjacent to a metal lock 10 so that is center lies on the crack 32 and the lacing bore slightly bites into the center lobe 24 of the positioned metal locks 10. This lacing bore is then tapped with female threads to receive in threaded engagement a lacing plug 52 and the lacing plug 52 is threaded into the lacing bore. The lacing plug 52 is then finished; such finishing may involve removing the head of the lacing plug 52 and peening and/or grinding the portion of the lacing plug 52 remaining above the surface of the casting 30 until the lacing plug 52 lies flush with that surface. However, the preferred system for repairing castings of the present invention uses an improved lacing plug which will be described more fully below.

After the first lacing plug 52 is set and finished, a second lacing plug is similarly positioned, set and finished on the opposite side of the center lobe 24 of the metal lock 10. Subsequent lacing plugs 52 are positioned, set and finished along the crack 32 by alternating from one side of the metal lock 10 to the other in a similar fashion. For each lacing plug 52 to be placed on the crack 32, a lacing bore is drilled so that it slightly bites into the next adjacent lacing plug 52 and so that its center lies on the crack 32. (It should be noted that the bite illustrates in FIG. 4 for each lacing plug is exaggerated for the purposes of demonstration. It is not usually necessary to incorporate the degree of bite shown in FIG. 4). The lacing bore is tapped for threaded engagement with the lacing plug 52 and the lacing plug 52 is threaded therein. The lacing plug 52 is then finished before moving on to setting and finishing the next lacing plug 52. This procedure is repeated until the entire crack 32 is sealed from leakage. FIG. 4 illustrates how the exterior of the casting repair will look after inserting a single metal lock 10 and a plurality of lacing plugs 52 along the crack. FIG. 5 illustrates how the exterior of a casting repair may look wherein a plurality of metal locks 10 and lacing plugs 52 are used to seal the crack or break.

In the event that the lacing leaks after inserting lacing plugs 52 along the crack 32, additional lacing plugs 52 can be placed into the casting 30 where the lacing leaks. This is done merely by locating the leak and drilling a lacing bore at that location. The lacing bore is then tapped and a lacing plug 52 is threaded therein, set, and finished. This procedure is continued until all leaks have been repaired.

Another preferred method for placement of lacing plugs 52 is to drill a series of lacing bores at spaced intervals along the crack 32; these spaced intervals being less than the diameter of a lacing plug 52. Lacing plugs 52 are then threaded into, set and finished for each lacing bore. A second series of lacing bores can then be drilled between and intersecting slightly with each of the lacing plugs 52 just set. Lacing plugs 52 are then threaded into, set and finished for each of the lacing bores in the second series. This method for installing lacing plugs 52 along a crack is much more rapid than drilling, tapping, threading, setting and finishing each lacing bore and lacing plug 52 one at a time.

Referring now to FIGS. 6-10, it is preferred that the improved lacing plug illustrated be used in the repair system of this invention. The preferred lacing plug 60 has a head 62 and a tapered shaft 64 which has straight threads 66, a shoulder 68 and a break-off groove 70. The head 62 is of a conventional configuration to facilitate the threading of the lacing plug 60 into a prepared lacing bore. It is preferred, however, that the head 62 have a hexagonal configuration so that an air wrench can be used to thread the lacing plug 60 into its lacing bore.

The tapered shaft 64 enables the lacing plug 60 to be inserted into a lacing bore with ease and facilitates the starting of the threaded engagement with the bore. In the preferred embodiment of the repair system of this invention, each lacing bore 72 prepared to receive a lacing plug 60 is a straight bore having straight female threads 74. (See FIGS. 7-10.) In this way, a straight thread tap may be used to prepare the bore in the conventional manner. This reduces the likelihood that the tap will break and eliminates the problems associated with tapping a straight hole with a tapered tap. Also, the lacing bore 72 will receive the straight male threads 66 of the lacing plug 60.

The preferred lacing plug 60, as shown in FIG. 6, is shown partially inserted into a lacing bore 72 in FIG. 7, and an enlarged view is shown in FIG. 8. At this stage of insertion, the threads 74 are snugly engaging the threads 66 of the lacing plug 60 and the shoulder 68 is above the surface of the casting 30. Upon turning the lacing plug 60 further into the lacing bore 72, the shoulder 68 crushes the first few threads 74 of the lacing bore 72, as shown in FIG. 9. This serves to seal off the lacing bore 72 from leaks and reduces or eliminates the need to later peen the lacing plug 60.

When the lacing plug 60 is fully seated, the twisting torque applied to eat the plug 60 will cause the plug 60 to break off at the break-off groove 70, as shown in FIG. 10. This serves to eliminate the need to remove the head by typically used conventional means. So long as the break-off groove 70 has a depth greater than the threads 66 and is disposed above the threads 66, the lacing plug 60 will break above the surface of the casting 30. By manufacturing the break-off groove 70 at a predetermined depth, the torque at which the head 62 will break off can be determined. It is preferred that the break-off groove 70 have a depth that requires a torque sufficient to cause the shoulder 68 to crush the first few threads 74 of the lacing bore 72 before the head 62 breaks off.

By using the preferred lacing plug 60, it may not be necessary to peen the plug 60 to seat it properly. Thus, the finishing of the plug 60 usually requires only grinding the shaft 64 down to the casting 30 surface. This reduces the likelihood that previously inserted plugs 60 will be loosened by the insertion of an adjacent plug 60 and reduces the likelihood of leaks.

Turning now to FIGS. 11 and 12, another preferred embodiment of the present repair system of this invention utilizes a metal bar lock 80. The metal bar lock 80 is elongated and has a substantially planar top surface 82 which is parallel to a bottom surface 84. The metal bar lock 80 also has a plurality of notches 86 which define an irregular configuration for the peripheral edge of the metal bar lock 80. The notches 86 are aligned along the opposite longitudinal sides 88 and are substantially semi-circular. It is preferred that the notches 86 on one longitudinal side 88 be offset from the notches 86 along the opposite longitudinal side 88 (i.e., the center of the notches 86 on opposite longitudinal sides 88 do not lie in a plane which is substantially perpendicular to the longitudinal axis of the metal bar lock 80). It is also preferred that the notches 86 be aligned such that notches 86 on the same longitudinal side 88 are disposed at equal intervals of distance. It is further preferred that the notches 86 on opposite longitudinal sides 88 be offset such that the center of a notch 86 on one longitudinal side 88 lies in a plane that is one half the distance between the centers of adjacent notches 86 on the same side 88 from the center of the next adjacent notch 86 on the opposite side 88. This preferred configuration of the metal bar lock 80, as shown principally in FIG. 11, introduces symmetry and strength to the metal bar lock 80 which would otherwise be absent.

In using the metal bar lock 80 of the present invention in metal casting repair, an irregular recess 90 is prepared to receive the metal bar lock 80. It is preferred that the irregular recess 90 be carved or hogged from the casting 30, as shown in FIG. 14, such that it conforms with the peripheral contour of the metal bar lock 80 except that where notches 86 are located in the metal bar lock 80 corresponding semi-circular casting notches 92 are provided. Such casting notches 92 to be carved out to have substantially the same diameter as the notches 86 in the metal bar lock 10.

Further, it is preferred that each of the casting notches 92 have substantially the same center as a corresponding notch 86 in the metal bar lock 80 when the metal bar lock 80 is inserted into the irregular recess 90. In this manner, the notches 86 and casting notches 92 define receiving bores 94 (shown in FIG. 13A as shaded areas) for receiving securing plugs 96.

The metal bar lock 80 is placed over the irregular recess 90 such that the notches 86 and casting notches are in register. The metal bar lock 80 is then pounded into the recess 90 using a hammer or the like. It is preferred that the metal bar lock 10 be inserted by pounding from its center and outwardly therefrom. Again, this procedure tends to lock the crack 32 to prevent further separation of the crack 32. Also, similar to the metal lock 10, one or more metal bar locks 80 can be inserted into a recess 90. Further, it is also preferred that the metal bar lock 80 be slightly oversized in width and undersized in length.

Once the metal bar lock 80 is in place, the receiving bores 94 can be tapped with threads to receive securing plugs 96 to secure the metal bar lock 80 within the recess 90. It is preferred that the receiving bores 94 are tapped with straight threads and that the securing plugs 96 are of the preferred type of lacing plug 60 as has been described herein in reference to FIGS. 6-10.

FIG. 13B illustrates what the appearance would be of the finished surface of a repair using the present invention. It shows the metal bar lock 80 and the securing plugs 96 disposed in the receiving bores 94 to secure the metal bar lock 80 within the prepared irregular recess 90.

Again, the depth of the irregular recess 90 depends on the thickness of the casting 30 and the nature of the crack 32 to be repaired. The use of a metal bar lock 80 to repair a casting 30 is particularly appropriate wherein, for some reason, the repairman is unable to precision drill near the damaged area. In such cases, the repairman can still usually hog out by grinding a recess 90 that will receive a metal bar lock 80.

The present invention may be embodied in the specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. Apparatus for repairing a casting having a crack therein, said apparatus comprising
   a metal lock adapted to be inserted into a line of overlapping holes of alternating large and small diameters drilled to a desired depth and extending substantially transverse to the crack, said metal comprising
      a rigid elongated member having a plurality of lobes formed from adjacent portions that are circular in cross-section and each having its center on the longitudinal axis of the elongate member, said lobes being of alternating large and small diameters and including a central large diameter lobe and at least one outer large diameter lobe at each side of the central large diameter lobe, said central large diameter lobe being spaced from each outer large diameter lobe by a small diameter lobe and with each adjacent lobe overlapping its adjacent lobes and extending through the elongate member.

2. Apparatus as in claim 1, wherein
   the rigid elongate member includes a plurality of outer large diameter lobes and a small diameter lobe interconnecting each adjacent pair of large diameter lobes.

3. Apparatus as in claim 1, further including at least one lacing plug adapted to be inserted into said crack, said lacing plug including
   a head configured to receive a driving tool;
   a tapered shaft;
   a shoulder at a top of the tapered shaft;
   a non-threaded shaft portion interconnecting the head and the tapered shaft;
   a break-off groove formed in the non-threaded shaft portion adjacent to the shoulder; and
   straight threads formed on the tapered shaft, said threads having a uniform minor pitch diameter and a tapered major pitch diameter, said major pitch diameter being parallel to the outer diameter of the tapered shaft.

4. Apparatus as in claim 3, wherein
   the innermost diameter of the break-off groove is smaller than the minor pitch diameter of the threads.

5. Apparatus as in claim 4, wherein
   the shoulder has an outer diameter that is larger than the major pitch diameter of the threads.

6. Apparatus as in claim 1, wherein
   the large diameter lobes each have substantially the same diameter.

7. Apparatus as in claim 6, wherein
   the small diameter lobes each have substantially the same diameter.

8. Apparatus as in claim 1, wherein
   the small diameter lobes each have substantially the same diameter.

9. Apparatus as in claim 1, wherein
   at least some of the large diameter lobes are of different diameters.

10. Apparatus as in claim 9, wherein
    at least some of the small diameter lobes are of different diameters.

11. Apparatus as in claim 1, wherein
    at least some of the small diameter lobes are of different diameters.

12. Apparatus for repairing a casting have a crack therein, said apparatus including at least one lacing plug adapted to be inserted into said crack, said lacing plug including
    a head configured to receive a driving tool;
    a tapered shaft;
    a shoulder at a top of the tapered shaft;
    a non-threaded shaft portion interconnecting the head and the tapered shaft;
    a break-off groove formed in the non-threaded shaft portion adjacent to the shoulder; and
    straight threads formed on the tapered shaft, said threads having a uniform minor pitch diameter and a tapered major pitch diameter, said major pitch diameter being parallel to the outer diameter of the tapered shaft.

13. Apparatus as in claim 12, wherein
    the innermost diameter of the break-off groove is smaller than the minor pitch diameter of the threads.

14. Apparatus as in claim 13, wherein the shoulder has an outer diameter that is larger tyhan the major pitch diameter of the threads.

* * * * *